July 2, 1929.  A. S. CLAPP  1,719,391
STEREOPTICON APPARATUS
Filed Sept. 16, 1926   4 Sheets-Sheet 3
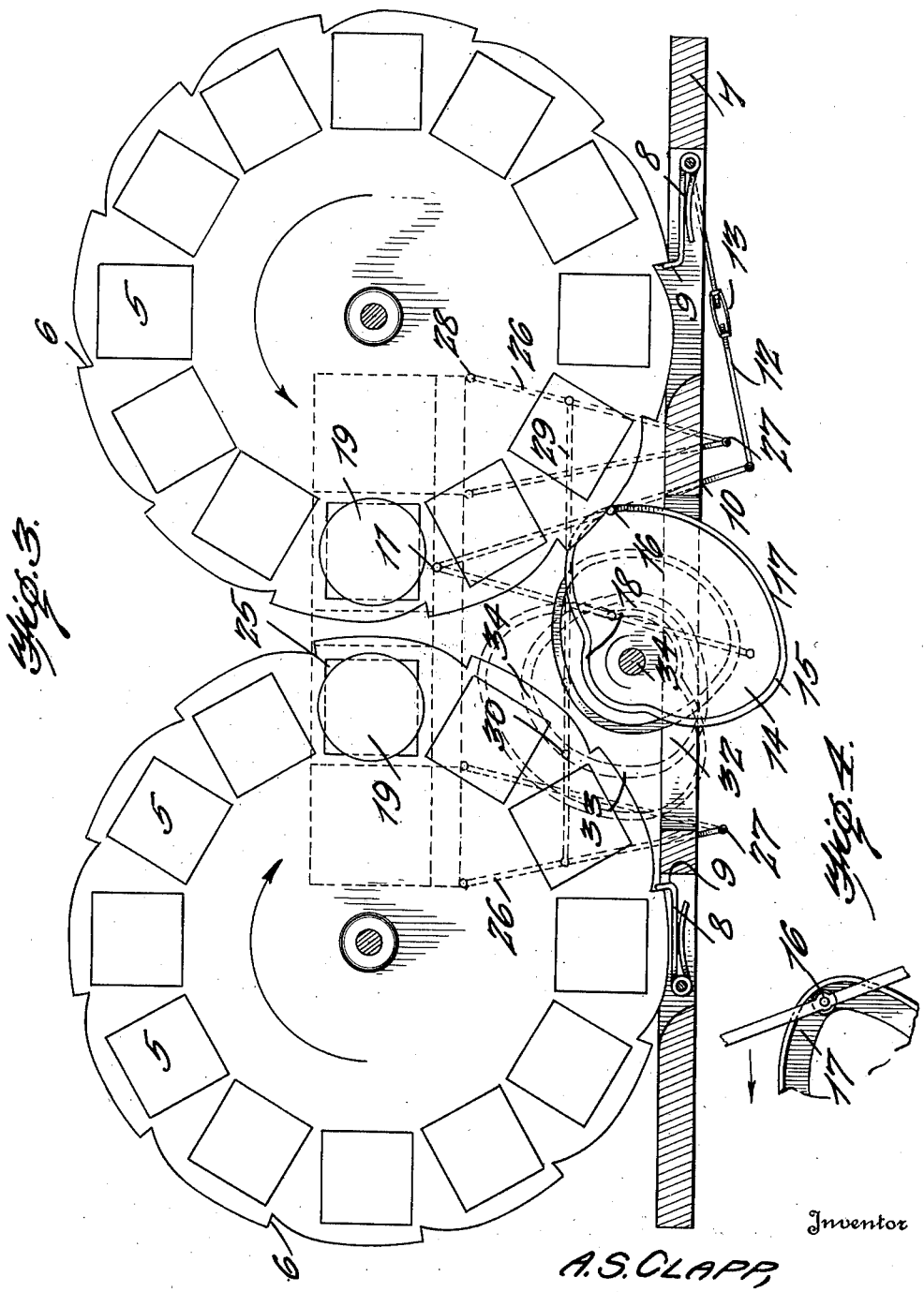
Inventor
A. S. CLAPP,
By
Attorney July 2, 1929.  A. S. CLAPP  1,719,391
STEREOPTICON APPARATUS
Filed Sept. 16, 1926  4 Sheets-Sheet 4

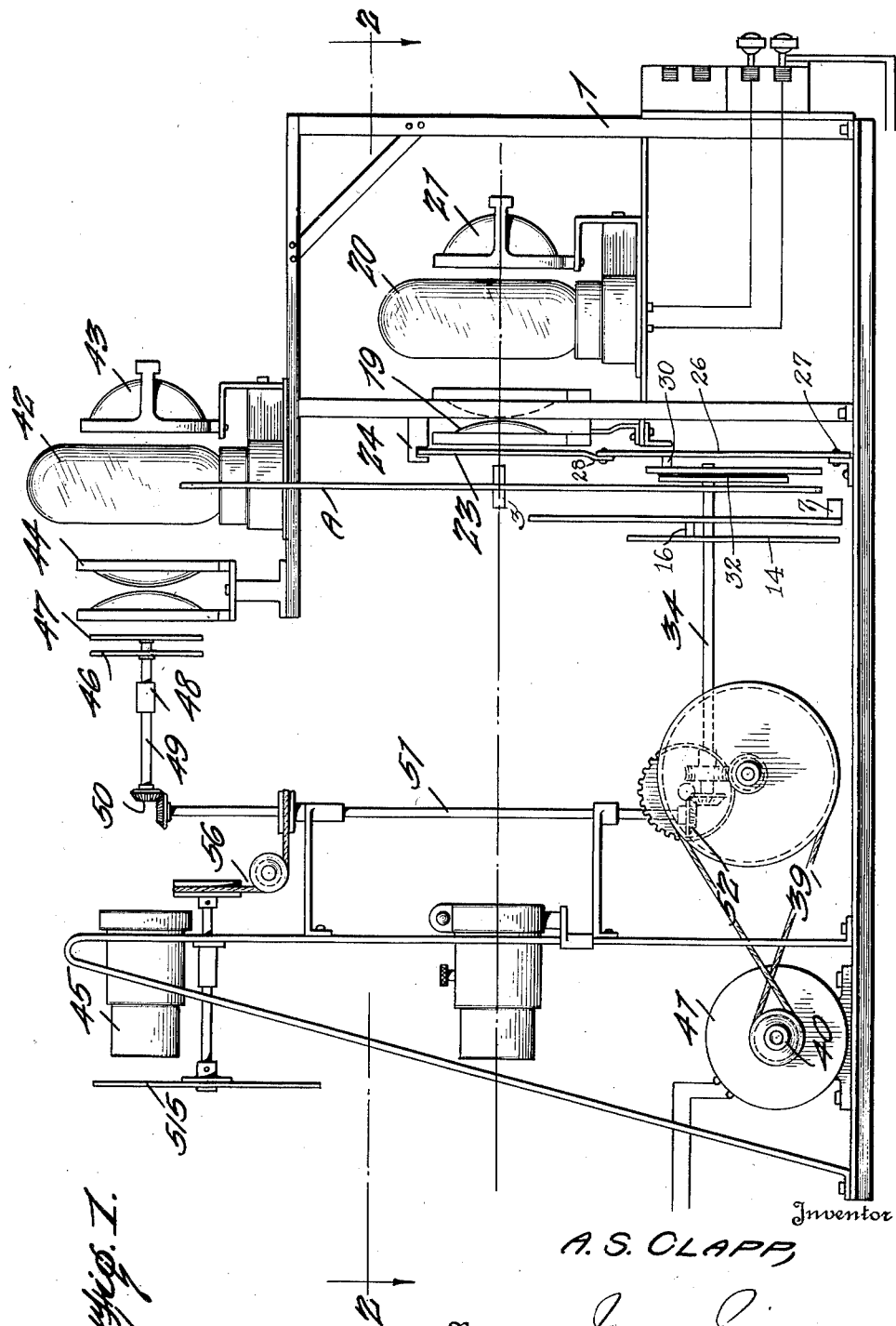

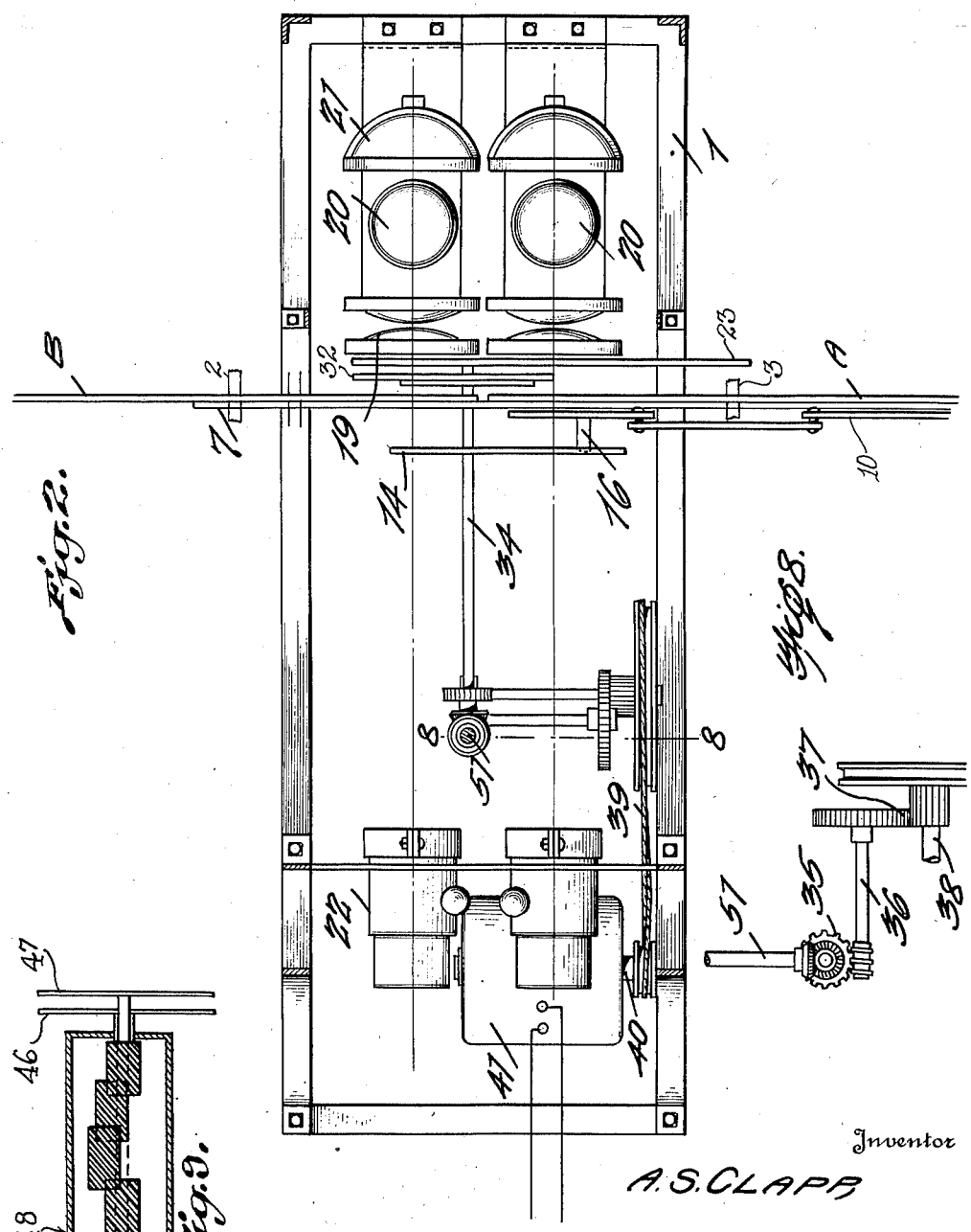

Inventor
A. S. CLAPP,
By Jno Imrie
Attorney

Patented July 2, 1929.

1,719,391

UNITED STATES PATENT OFFICE.

ALMAN S. CLAPP, OF SPOKANE, WASHINGTON, ASSIGNOR TO ELECTRIC BULLETIN CORPORATION, OF SPOKANE, WASHINGTON.

STEREOPTICON APPARATUS.

Application filed September 16, 1926. Serial No. 135,922.

This invention relates to an improvement in stereopticon apparatus designed for the automatic projection of standard or appropriate lantern slides in successive order upon a screen or other surface.

The invention is particularly concerned with the motor driven apparatus of the type described wherein the slides are mounted on independent disc like carriers adapted to be automatically positioned in line with a source of illumination with the projection of the respective slides automatically controlled by a shutter for properly governing the illumination of the screen.

One of the main objects of the invention is the provision and control of a secondary display system constructed to project a border outline for the pictures on the screen, with such outline colored if desired, and controlled to present a continually changing or animated appearance.

A further object of the present invention is the provision of means for controlling the relative movements of the slide carriers and of the shutter so that both slide carriers are in display position and stationary while the shutter is changing to cut off the previously displayed picture and expose a succeeding picture, so that the light is cut off from the slide of one carrier as it is being admitted to the slide of the other carrier, so that in screen appearance one picture is apparently being rolled up as the other is being unrolled to take its place.

The invention is illustrated in the accompanying drawings in which:

Fig. 1 is a view in elevation of the improved machine.

Fig. 2 is a section on line 2—2 of Fig. 1, the switch being omitted.

Fig. 3 is an enlarged view showing the slide carriers, shutter, and operating means therefor.

Fig. 4 is a broken perspective view showing the connection between the operating bars and the cams.

Fig. 8 is a section on line 8—8 of Fig. 2.

Fig. 9 is a view illustrating the means for oppositely driving the disks used in the border display system.

Figure 5:
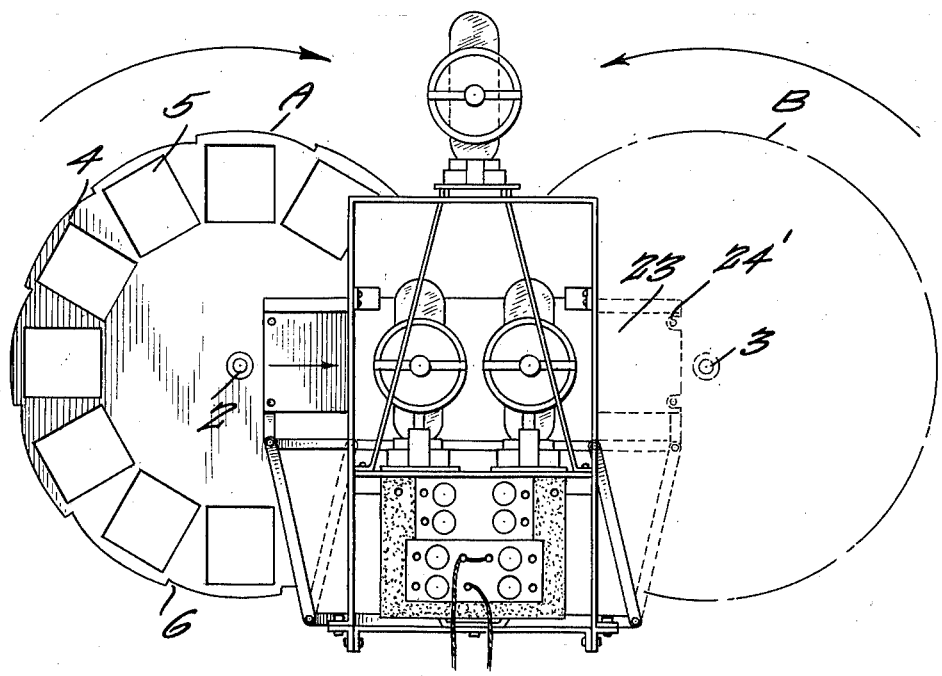
Fig. 5 is a rear elevation of the machine.

The improved machine comprises an appropriate frame 1 which may be and preferably is of skeleton form. Supported for rotative movement on frame supported centers 2 and 3, are the slide carriers indicated at A and B. These slide carriers are in the form of discs having radially disposed receiving means 4 in which the slides 5 to be displayed may be temporarily secured. The carriers are arranged in alignment transversely of the frame with their proximate edges slightly spaced apart and, as will later appear, are designed to be moved in opposite directions, that is, with their inner peripheries moving downwardly. The slides of each carrier thus travel in a plane concentric with the center of that carrier so that in any one position of the respective shutters there are two slides, one on each carrier arranged in display position. This display position is one with the respective slides in horizontal alignment, side by side, with a minimum distance between them.

Each carrier A and B is formed with a series of peripheral notches 6 arranged to present abrupt shoulders in a direction of travel of the particular carrier and merging into the peripheral edge of the carrier in the opposite direction. The carriers are operated in succession through the medium of a bar 7 mounted for transverse sliding movement in the frame immediately below the carriers and operated adjacent each end with a spring pressed dog 8 having an engaging end 9 positioned to engage the respective notches 6 of the carriers. As the bar 7 is disposed below the carriers and the operative ends of the dogs 8 project in opposite direction relative to the center of such bar, it will be apparent that if the bar is reciprocated in one direction one of the dogs will engage the notch 6 in one of the carriers and rotate such carrier a distance of one notch, while the remaining dog is moving freely over the periphery of the other carrier to a point to engage a succeeding notch, so that in the movement of the bar in the opposite direction the carrier remaining stationary in the first movement will be operated to the extent of a single notch.

Thus the carriers are alternately operated, but it will be apparent that in any one position of the carriers there are two slides in display position, for while one carrier is advancing the other carrier remains stationary, hence the slide of the stationary carrier, and of the one advanced will be in display position at the same time. The bar 7 is reciprocated through the medium of a rod 10 pivotally supported at one end as at 11 on the frame and connected at the opposite end through a rod 12 with the bar 7, the rod 12 preferably including an adjusting member 13 whereby the length of the rod may be accurately determined to properly position the respective carriers. The rod 10 is operated through the medium of a cam 14 having a cam groove 15 to receive a roller 16 projecting from the rod 10. The cam groove 15 is so formed that portions of such groove, indicated at 17 and 18, are concentric with the axis of the cam to thereby prevent movement of the bar 7 while the roller 16 is travelling through these concentric cam portions. Thus, both slide carriers are stationary at a particular period, which period is during the time the shutter is being operated as will later appear.

The carriers operate in front of condensers 19 receiving light from a source of illumination 20 with reflectors 21, the system including any usual type of objective lenses 22. There is thus a display system for the slide of each carrier, as such slide is arranged in display position, it being of course understood that each system is arranged to project the display into the same rectangular space on the receiving surface.

As there are independent display systems it is of course apparent that the light must be controlled to secure the display of a single slide at a time, and for this purpose there is provided what may be termed a shutter 23 adapted for reciprocating travel in guides 24 between the condensers and carriers to alternately cut off the light of the respective sets of condensers and thereby illuminate the slide of but one carrier. The shutter may be, and preferably is, an appropriate section of opaque material formed with an opening 25 which is alternately arranged in line with the display position of either carrier. The shutter opening thus moves from one display position to the other, and as these respective display positions are closely adjacent, it will be apparent that the opening in the shutter will serve to simultaneously display portions of both slides which are then in display position, as the shutter moves from one operative position to another. This has an important result in connection with the present apparatus, which will be later specifically referred to. The shutter is operated through the medium of rods 26 pivotally connected at their lower ends at 27 to the frame 1 and at their upper ends at 28 to the shutter. It will be noted that the shutters are mounted for adjustment on and relative to the oscillating frame as indicated at 24′ in Fig. 5. This adjustment is necessary for when the objective lenses are brought to focus on the screen at a given distance the shutter will have to be adjusted to that particular distance and any change in the distance of the machine from the screen will require further adjustment of the shutters incident to the fact that the shutters are slightly out of the focal plane of the objective. The rods 26 are connected intermediate their ends by a transverse rod 29 on which is mounted a roller 30 cooperating with the cam groove 31 in a cam 32. The cam groove 31 of cam 32 has a concentric portion 33 serving to hold the shutter stationary in final display position at its respective limits of movement, thereby making a full display of the vertical slide for the desired length of time. The cams 14 and 32 are fixed upon a shaft 34 adapted to be operated in any suitable manner. For convenience, such shaft 34 may be operated through worm gearing 35 driven by shaft 36 having spur gearing connection at 37 with a shaft 38 connected through a belt and roller drive 39 with the shaft 40 of a motor 41. The belt drive 39 and the various gearing connections are such as to impart the desired speed of movement to the slide carriers and to the shutter.

Figure 6:
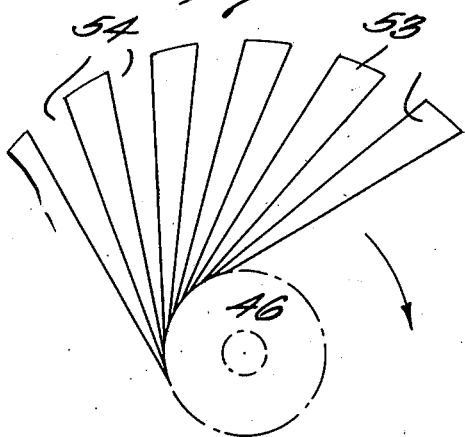
Figs. 6 and 7 are broken views in elevation of the respective discs for controlling the movement of the border illumination.
Figure 7:
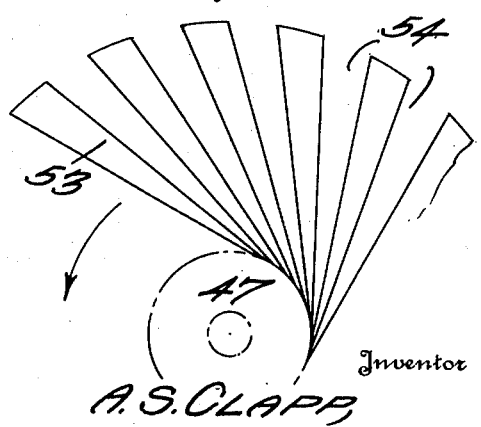

In connection with the display system described, which is concerned more particularly with the displaying of the lantern slides, there is combined another display system designed primarily to provide an illuminated border for the images of the slide display system. This auxiliary display system, which will be hereinafter termed a border display, is supported above the slide display system, and includes a source of illumination 42 with a reflector 43 and condensers 44, the light from the latter being masked so that only the illumination for the desired border passes therethrough. The usual objective lens 45 is provided in this border display system, and intermediate the condensers and objective lens are provided discs 46 and 47, shown more particularly in Figs. 6 and 7, designed to break up the otherwise steady illumination so as to render the same animated to an extent permitted or controlled by these discs. The discs are driven in opposite directions through any appropriate type of gearing 48 operating from a shaft 49 driven through bevel gears 50 from a vertical shaft 51 operated through bevel gears 52 from shaft 34.

The discs 46 and 47 have a series of tangentially disposed blades 53 providing divergent spaces 54 between them. As these discs rotate in opposite directions, it will be apparent that the light permitted to pass therethrough in the inter-lapping openings 54 will apparently radiate outwardly, and as the light permitted to pass through these discs is only that necessary to illuminate the border of the display area, such border display will apparently be made up of a series of radiating and animated flashes which may thus readily simulate flame or other desired phenomena.

If desired, and as preferred, the light of the border display controlled by the discs 46 and 47 may, following its projection through the objective lens, be colored by a color wheel 55 operating in front of the objective lens 45 and driven by drive connection 56 from shaft 51. The color wheel 55 may have segments of transparent gelatine in various colors to thereby continually change the border display.

In operation, the desired slides are placed in the carriers and the motor started. In the operation the carriers are alternately moved to position the particular slide of each carrier in display position, and it is to be noted that following each display movement of the carrier there is a predetermined period of rest for both carriers. During this period of rest, the shutter 23 is changing from the display position relative to one carrier to the display position relative to the other carrier, that is to say, to admit light to the particular slide of one carrier and cut off the light from the particular slide of the other carrier. Thus, as the shutter moves the display opening therein will of necessity gradually cut off one display and gradually expose the other display. This has the effect in the appearance on the screen as if the image being cut off was being rolled up, and as if the image being exposed was being unrolled. The effect on the eye is that one image does not merge into the other, or is not cut off before such other is displayed, but is apparently being gradually cut off in direct proportion as the other is being displayed. As the shutter is designed to be operated in the focal plane the image of the edge of the shutter opening will appear on the screen in a clear, well defined line, which as it moves across the surface of the screen will cause the image being cut off to appear as if it is being rolled up and in the rolling up display the succeeding image.

The border system will define a border of animated and, if desired, colored light accurately defining the display space of the slides, and in the particular arrangement of the discs 46 and 47, disclosed it will be apparent that this border illumination will be cut up into diamond shaped splashes radiating from the center and enlarging uniformly as they travel outward. The color disc of the border projection is arranged forward of the objective lens thus intercepting the light projecting from the border system at a point where the rays leave the objective lens and are of course not parallel. As a result, there is a blending of the two colors on the screen which is incident to this particular disposition of the color discs. Of course, it is understood that the color disc or screen may be disposed in the focal plane of the objective lens for the border system if desired.

What I claim as new is:

1. In a stereopticon apparatus, a plurality of slide carriers with their axes in the same horizontal plane, means for operating the respective slide carriers in succession to present the slides of the respective carriers successively in display position, display means for the respectively positioned slides, a single shutter formed with an opening of a size to permit the display of a single slide, and means for moving the shutter so that its opening is moved from in front of the slide of one carrier to a position in front of the slide of the other carrier, the movement of the shutter causing the light to be gradually cut off from one slide and as gradually and simultaneously admitted to the other slide.

2. In a steropticon apparatus, two slide carriers arranged in horizontal alignment, means for successively operating the carriers to thereby dispose the slides of such carriers in display position, said means operating alternately on the carriers, display means for the slides of the carriers arranged in display position, a single shutter formed with an opening of a size to permit the display of a single slide, and means for moving the shutter so that its opening is moved from in front of the slide of one carrier to a position in front of the slide of the other carrier, the movement of the shutter causing the light to be gradually cut off from one slide and as gradually and simultaneously admitted to the other slide.

3. In a steropticon apparatus, a plurality of slide carriers, slides in the carriers, means for operating the carriers alternately to move the slides of each carrier successively to display position, said means permitting the carriers to remain at rest with a slide of each in display position, and a shutter formed with a single opening for controlling the display of the slides, said shutter being movable to cause one edge of the opening to gradually cut off the light from one of the slides while the opposite edge of the opening is moving to gradually admit light to the adjacent slide, whereby the image of one slide appears to be cut off by being rolled up and the image of the adjacent slide appears to be moved into display position by being unrolled.

4. In a stereopticon apparatus, duplicate slide carriers arranged in line, slides in the carriers, operating means for the carriers to alternately advance the respective carriers to dispose the slides thereof in display position in succession, a single shutter formed with a display opening, means for moving the shutter to cause the display opening to move from the exposed slide to the slide to be exposed, the movement of the shutter causing the exposed slide to gradually disappear while the slide to be exposed is being gradually and simultaneously brought into view, and means for displaying a border about the projected image of the particular slide.

5. In a stereopticon apparatus, duplicate slide carriers arranged in line, slides in the carriers, unitary operating means for the carriers to alternately advance the respective carriers to dispose the slides thereof in display position in succession, a single shutter formed with a display opening, means for moving the shutter to cause the display opening to move from the exposed slide to the slide to be exposed, the movement of the shutter causing the exposed slide to gradually disappear while the slide to be exposed is being gradually and simultaneously brought into view, and means for displaying a border about the projected image of the particular slide, and means for controlling the projection of the border display to render the same animated.

6. In a stereopticon apparatus, duplicate slide carriers arranged in line, slides in the carriers, unitary operating means for the carriers to alternately advance the respective carriers to dispose the slides thereof in display position in succession, a single shutter formed with a display opening, means for moving the shutter to cause the display opening to move from the exposed slide to the slide to be exposed, the movement of the shutter causing the exposed slide to gradually disappear while the slide to be exposed is being gradually and simultaneously brought into view, and means for displaying a border about the projected image of the particular slide, and oppositely acting slotted discs arranged in the path of the light of the border display to render such display animated.

7. In a stereopticon apparatus, duplicate slide carriers arranged in edge alignment and mounted for rotation, slides in the carriers, each carrier being formed with peripheral notches, a bar mounted for reciprocation directly beneath both carriers, a dog in the bar underlying each carrier, means for influencing the dogs towards the carriers, and a cam operating to reciprocate the bar to cause the dogs to cooperate with the notches of the carriers alternately, said cam containing phases to permit the carriers to remain simultaneously at rest with a slide of each in display position.

8. In a stereopticon apparatus, duplicate slide carriers arranged in alignment, slides in the carriers, each carrier being formed with peripheral notches, a bar formed with dogs to cooperate with the notches in the carriers, and a cam to reciprocate the bar towards the dogs to cooperate with the notches of the carriers alternately, said cam containing phases to permit the carriers to remain simultaneously at rest with a slide of each in display position, an independent display means for the slides of each carrier, and a shutter operating in the focal plane of the display means and serving to gradually cut off the display of one slide while simultaneously and gradually effecting the display of the other slide.

9. In a stereopticon apparatus, duplicate slide carriers arranged in alignment, slides in the carriers, each carrier being formed with peripheral notches, a bar formed with dogs to cooperate with the notches in the carriers, and a cam to reciprocate the bar towards the dogs to cooperate with the notches of the carriers alternately, said cam containing phases to permit the carriers to remain simultaneously at rest with a slide of each in display position, an independent display means for the slides of each carrier, and a shutter operating in the focal plane of the display means to control the display of the said slides in succession, and a cam for operating the shutter.

10. In a stereopticon apparatus, a plurality of slide carriers, slides therein, a single means for alternately operating the slides in succession to thereby arrange a slide of each in display position, a single exposure means for controlling the display of the positioned slides, said exposure means including a single control opening, and mechanism for operating said single exposure means to cut off the light from one edge of one slide while gradually admitting light to the similar edge of the adjacent slide through said opening, the exposure means continuing to move until one of the slides is completely cut off and the other completely exposed, the operating means acting on the carrier carrying the cut off slide while the latter is cut off.

11. In a stereopticon apparatus, a plurality of slide carriers, slides therein, a single means for alternately operating the slides in succession to thereby arrange a slide of each in display position, a single shutter for controlling the display of the positioned slides, said shutter including a single control opening, and mechanism for operating said shutter to cut off the light from one edge of one slide while gradually admitting light to the similar edge of the adjacent slide through said opening, the shutter continuing to move until one of the slides is completely cut off and the other completely exposed, the operating means acting on the carrier carrying the cut off slide while the latter is cut off.

In testimony whereof I affix my signature.

AL. S. CLAPP.